United States Patent
Nammi et al.

(10) Patent No.: US 11,362,793 B2
(45) Date of Patent: Jun. 14, 2022

(54) DETERMINING CHANNEL STATE INFORMATION IN 5G OR OTHER NEXT GENERATION WIRELESS COMMUNICATION SYSTEMS WITH MULTIPLE TRANSMISSION POINTS

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 268 days.

(21) Appl. No.: 16/713,253

(22) Filed: Dec. 13, 2019

(65) Prior Publication Data

US 2021/0184817 A1 Jun. 17, 2021

(51) Int. Cl.
*H04W 72/12* (2009.01)
*H04W 72/08* (2009.01)
*H04L 5/00* (2006.01)
*H04W 72/04* (2009.01)

(52) U.S. Cl.
CPC .......... *H04L 5/0057* (2013.01); *H04L 5/0051* (2013.01); *H04W 72/0413* (2013.01); *H04W 72/082* (2013.01)

(58) Field of Classification Search
CPC ............... H04L 5/0051; H04L 5/0057; H04W 72/0413; H04W 72/082
See application file for complete search history.

(56) References Cited

U.S. PATENT DOCUMENTS

| | | | | |
|---|---|---|---|---|
| 2014/0269492 | A1* | 9/2014 | Forenza | H04B 7/0626 370/328 |
| 2015/0372742 | A1* | 12/2015 | Lee | H04L 5/0078 370/338 |
| 2019/0044679 | A1* | 2/2019 | Manolakos | H04W 72/042 |
| 2019/0373630 | A1* | 12/2019 | Gupta | H04W 72/042 |
| 2019/0379561 | A1* | 12/2019 | Zhang | H04L 5/0051 |

FOREIGN PATENT DOCUMENTS

EP 3703413 A1 * 9/2020 ........ H04W 72/0413

* cited by examiner

*Primary Examiner* — Brian P Cox
(74) *Attorney, Agent, or Firm* — Amin, Turocy & Watson, LLP

(57) ABSTRACT

The described technology is generally directed towards using demodulation reference signal (DMRS)-based channel state information (CSI) reporting in a wireless communications network with multiple transmit-receive points (TRPs). A user equipment computes joint CSI based on received DMRS data, e.g., received with downlink data traffic from two TRPs, such as co-located or backhaul connected TRPs. The DMRS-based joint CSI is reported to the multiple TRPs for use in scheduling subsequent data traffic, which can increase data throughput, and can reduce the frequency of CSI-RS reporting, increasing overall efficiency. The network can activate and deactivate DMRS-based CSI reporting.

20 Claims, 11 Drawing Sheets

DETERMINING CHANNEL STATE INFORMATION IN 5G OR OTHER NEXT GENERATION WIRELESS COMMUNICATION SYSTEMS WITH MULTIPLE TRANSMISSION POINTS

TECHNICAL FIELD

The subject application is related to wireless communication systems, and more particularly to computing and reporting channel state information (CSI) in wireless communication systems, such as fifth generation (5G) or other next generation wireless networks, with multiple transmission (transmit/receive) points.

BACKGROUND

In wireless communication systems, including New Radio (NR, sometimes referred to as 5G) and likely beyond, a user equipment computes channel estimates based on pilot or reference signals sent from a network device transmit-receive point (TRP), such as a gNode B (gNB). In general, the user equipment computes channel state information (CSI) based on the reference signals and reports the CSI to the network, which then computes communication parameters (e.g., modulation and coding scheme, power-related data, physical resource blocks and so on). These computed communication parameters are used for subsequent communications; for example, downlink control information (DCI) is sent via a downlink control channel to the user equipment to schedule the user equipment for receiving downlink transmissions from the TRP.

With multiple transmission points, the same procedure described above is repeated. For example, a second TRP similarly sends reference signals and receives a CSI report based on those reference signals. If the TRPs are co-located with multiple panels, or the connecting link between the TRPs comprises ideal backhaul, then the scheduling can be optimized, e.g., by using a single DCI.

Thus, with multiple transmission points and using a single downlink control channel, the user equipment sends a CSI corresponding to the particular TRP, that is, sends a first CSI based on the references signals received from a first TRP to the first TRP, and sends a second CSI based on the references signals received from the second TRP to the second TRP. However, during the scheduling the UE, the network uses an aggregated CSI to compute the (e.g., downlink) parameters, as the network uses a single physical downlink control channel (PDCCH) to send the DCI. For example, consider that the first CSI with a channel quality indicator (CQI) corresponding to the first TRP is CQI-1, while the CQI corresponding to the second TRP is CQI-2; in this case, the network device (e.g., the first TRP) uses the minimum quality (min(CQI-1, CQI-2)) or mean quality (mean(CQI-1, CQI-2)) as a joint CSI for scheduling. However the joint CSI can be significantly different depending on whether the quality information corresponds to min(CQI-1, CQI-2) or mean(CQI-1, CQI-2). Because of this mismatch between the estimated CSI and the scheduled CSI, loss in throughput occurs.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
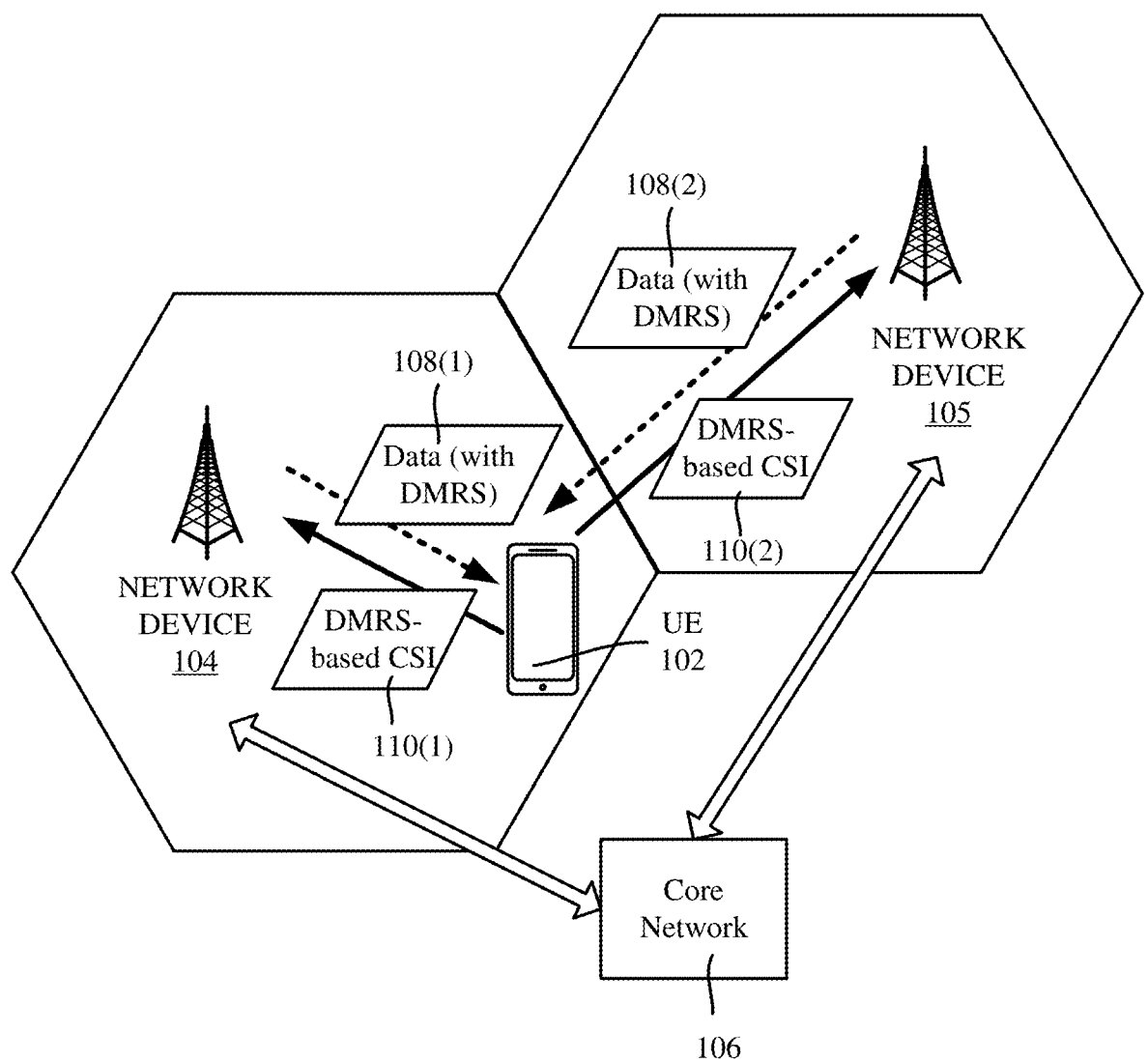
FIG. 1 illustrates an example wireless communication system in which a user equipment communicates with two transmit-receive points, including to report demodulation reference signal (DMRS)-based channel state information, in accordance with various aspects and implementations of the subject disclosure.

Briefly, one or more aspects of the technology described herein are generally directed towards computing the channel state information (CSI) using the scheduled physical downlink shared channel (PDSCH) and demodulation reference signals (DMRS, or DM-RS, with a hyphen) from multiple transmit-receive point devices (TRPs), thereby reducing the mismatch described above between the minimum or mean computed CSI and the individually computed CSI. As will be understood, the technology facilitates significant gains in user-experienced throughput, as the network obtains the information about the CQI efficiently. Moreover, the technology provides for a reduction in the signaling overhead, as less frequent reference signal-based (CSI-RS) reporting is needed.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject technology. In various embodiments, the system 100 is or comprises a wireless communication network serviced by one or more wireless communication network providers. In example embodiments, a UE 102 can be communicatively coupled to the wireless communication network via a network device 104 (e.g., network node) and/or a network device 105. The network device(s) can communicate with the user equipment (UE), thus providing connectivity between the UE and the wider cellular network.

In example implementations, the UE 102 is able to send and/or receive communication data via a wireless link to the network devices 104 and 105. The dashed arrow lines from the networks device 104 and 105 to the UE 102 represent downlink (DL) communications and the solid arrow lines from the UE 102 to the network devices 104 and 105 represents uplink (UL) communications.

In the example of FIG. 1, the wireless communication system 100 is depicted with a user equipment (UE) 102 that communicates with multiple (two) transmit-receive point devices, shown as the network device 104 and the network device 105. The network devices 104 and 105 are connected to a core network 106, and can communicate with one another, via ideal backhaul for example. Note that his is only one example implementation, and for example, the technology described herein operates with multiple TRPs that are co-located, e.g., at a single site having multiple antenna panels.

In one or more implementations, as described herein following reference signal-based (CSI-RS) reporting, the user equipment 102 reports the CSI using DMRS-based CSI reporting. For example, as shown in FIG. 1, the user equipment receives a downlink data transmission from multiple TRPs, such as a transmission 108(1) from the network device 104 (e.g., TRP-A) and a downlink data transmission 108(2) from the network device 105 (e.g., TRP-B). As further described herein, the user equipment determines and reports the CSI based on the DMRS received with the data transmissions, as shown via the DMRS-based CSI blocks 110(1) and 110(2).

The UE can estimate the signal-to-interference-plus-noise ratio (SINR) from the two TRPS as show below, where H is the joint channel matrix from the two TRPs:

$$SINR_i = H_i S^{-1} H_i,$$

$$S = N_0 R_N + HH^H - H_i * H_i^H$$

The system 100 can further include one or more communication service provider networks that facilitate providing wireless communication services to various UEs, including the UE 102 and others (not explicitly shown), via the network devices 104 and/or 105 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network devices 104 and 105 can be connected to the one or more communication service provider networks (e.g., the core network 106) via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UE 102 and the network devices 104 and 105) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream multiplexed or precoded using a precoding weights over all or a subset of the antenna. Different spatial layers are precoded or multiplexed using different weights from each other. The rank of the transmission is equal to the number of spatial layers in a spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DMRS) in NR system, for example, has reference symbols within a resource-block transmitted for a single antenna port 0; the same reference symbols are code multiplexed and transmitted on antenna port 1. Similarly for ports 2 and 3 same resource elements are used for transmitting DMRS (demodulation reference symbols), and are code multiplexed as in port 0 and 1. Further note that the resource elements used for rank 3 and rank 4 (ports 2 and 3) are orthogonal in frequency to that of port 0 and 1.

Figure 2:
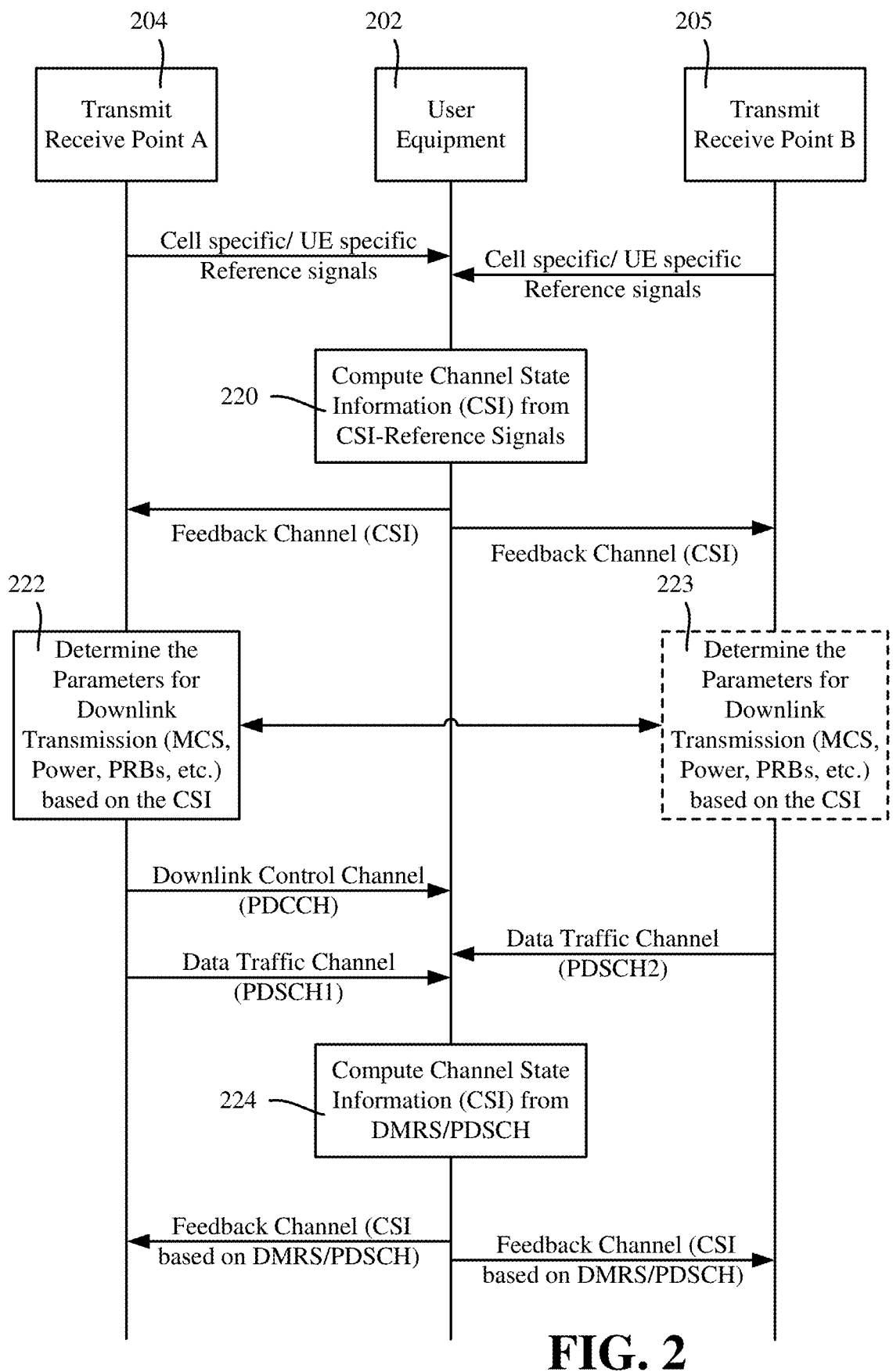
FIG. 2 illustrates an example timing/dataflow message sequence of a user equipment communicating with two transmit-receive points, including to report demodulation reference signal-based channel state information, in accordance with various aspects and implementations of the subject disclosure.

FIG. 2 shows a timing/dataflow diagram comprising a message sequence chart for DMRS-based CSI computation between a user equipment 202 and two transmit-receive points 204 and 205 (e.g., corresponding to the UE 102 and the network nodes 104 and 105 of FIG. 1, respectively). Note that FIG. 2 describes an example for downlink data transmission in multiple TRP systems, however the same principles are applicable to uplink and sidelink (e.g., vehicle-to-vehicle) systems.

In FIG. 2, cell specific/UE specific reference signals are sent from each transmit-receive point device 204 and 205 to the UE 202. As represented via block 220, the UE computes the Channel State Information (CSI) from the CSI-reference signals, that is, performs CSI-RS-based reporting. The CSI reports are each returned to the respective transmit-receive point devices 204 and 205 as represented via the feedback channels. This allows the transmit-receive points 204 and 205 (which can communicate via backhaul or by being co-located) to compute the downlink transmission parameters (blocks 222 and 223), including the modulation and coding scheme (MCS), power information, physical resource blocks (PRBs) and so on, based on the CSI-RS-based reporting. The downlink transmission parameters are sent to the user equipment 202 via one of the transmit-receive point devices (the device 204 in FIG. 2) via the corresponding physical downlink control channel (PDCCH).

The downlink control channel (PDCCH) carries information about the scheduling grants. Typically this consist of number of MIMO layers scheduled, transport block sizes, modulation for each codeword, parameters related to HARQ, sub band locations etc. Note that, all DCI formats may not use transmit all the information as shown above. In general, the contents of PDCCH depends on transmission mode and DCI format.

Typically, the following information can be transmitted by means of the downlink control information (DCI) format:
Carrier indicator
Identifier for DCI formats
Bandwidth part indicator
Frequency domain resource assignment
Time domain resource assignment
VRB-to-PRB mapping flag
PRB bundling size indicator
Rate matching indicator
ZP CSI-RS trigger
Modulation and coding scheme for each TB
New data indicator for each TB
Redundancy version for each TB
HARQ process number
Downlink Assignment Index
TPC command for uplink control channel
PUCCH resource indicator
PDSCH-to-HARQ feedback timing indicator
Antenna port(s)
Transmission configuration indication
SRS request
CBG transmission information
CBG flushing out information
DMRS sequence initialization With the computed and received parameters, the user equipment 202 can receive downlink data traffic via the physical downlink shared channels (PDSCH1 and PDSCH2 in FIG. 2). The data traffic includes DMRS data, which is then used to compute joint channel state information, that is, DMRS-based CSI at block 224. This joint DMRS-based CSI is then reported to the transmit and receive point devices 204 and 205 on respective feedback channels, whereby scheduling parameters can be computed for subsequent data traffic transmissions, and so on.

Note that although CSI-RS transmission and reporting is still used for purposes of setting up the initial data transmission, it will be understood that CSI-RS transmission and reporting can be used far less frequently for estimating the complete CSI from each transmission. Instead, as described herein, during the muting period of CSI-RS, the UE can estimate the SINR using DMRS/PDSCH and feed the CSI back to the network as shown in FIG. 2; that is the UE can estimate the CSI during the PDSCH decoding time, and the UE can decode the PDSCH as well as compute the CQI in the same slot.

Figure 3:
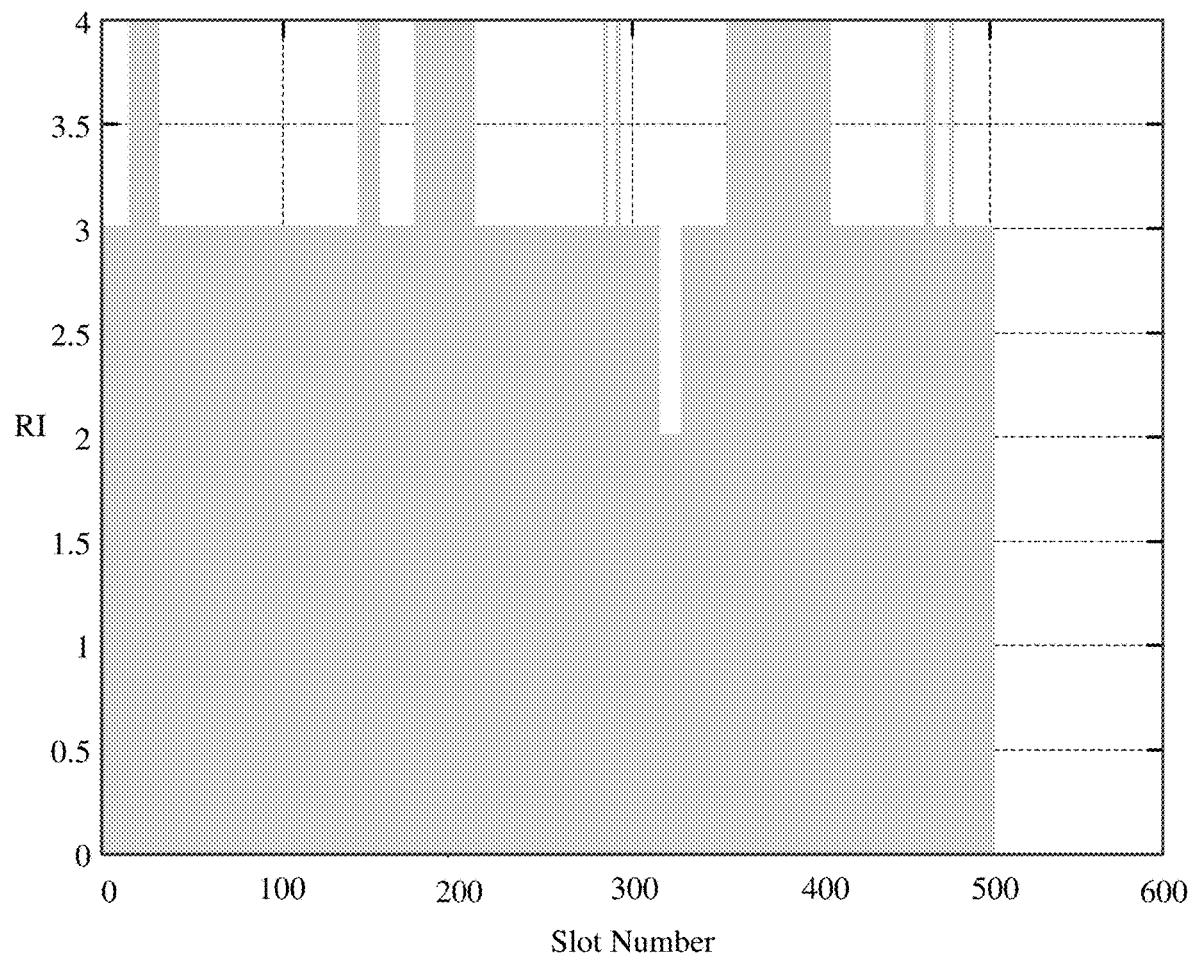
FIG. 3 is a graphical representation of rank indicator (RI) distribution over 0.5 msec at a signal-to-noise ratio of 20 decibels, in accordance with various aspects and implementations of the subject disclosure.
Figure 4:
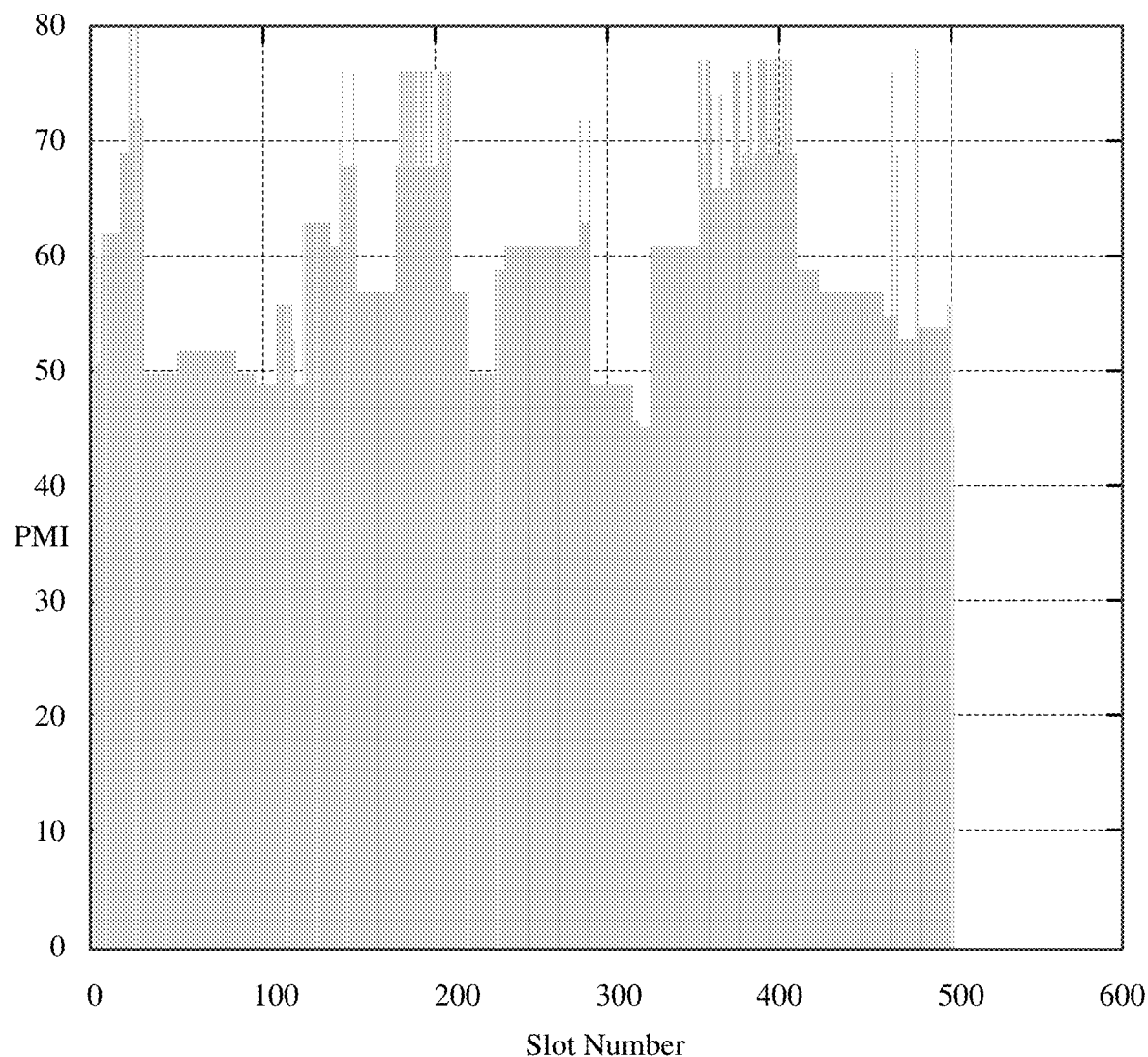
FIG. 4 is a graphical representation of precoding matrix indicator (PMI) distribution over 0.5 msec at a signal-to-noise ratio of 20 decibels, in accordance with various aspects and implementations of the subject disclosure.

FIG. 3 shows rank indicator (RI) distribution over 0.5 msec at SNR20 dB. As can be seen, in general, the rank indicator (RI) computed over the whole bandwidth does not significantly change for a single TRP. Similarly, as shown in FIG. 4, which shows the precoding matrix indicator (PMI) distribution (over 0.5 msec at SNR20 dB), it is seen that the PMI computed over the whole bandwidth for a single TRP does not significantly change.

As a result, when scheduled by a single PDCCH, when the UE computes the CSI using DMRS-based channel estimation for the scheduled rank and scheduled PMI, the CQI computed is similar to that of joint CSI-RS based channel estimation from the two TRPs. In this way, the UE can use channel estimation from DMRS or PDSCH based channel estimation for computing the CQI (the UE can estimate CSI during the PDSCH decoding time/the UE can decode the PDSCH and compute the CQI in the same slot). Note however that this technique is not used to compute RI/PMI. The possible CSI parameters with this technique are wideband CQI, sub-band CQI and Layer Indicator.

Figure 5:
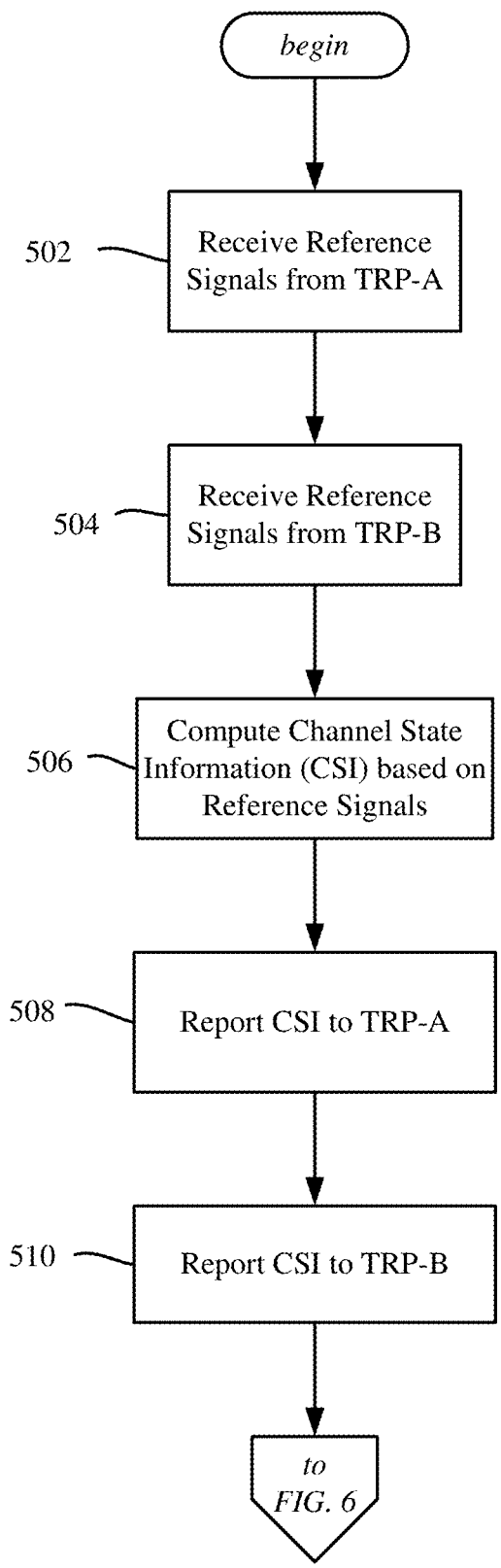
FIGS. 5 and 6 comprise a flow diagram of example operations of a user equipment to perform DMRS-based channel state information reporting, in accordance with various aspects and implementations of the subject disclosure.
Figure 6:
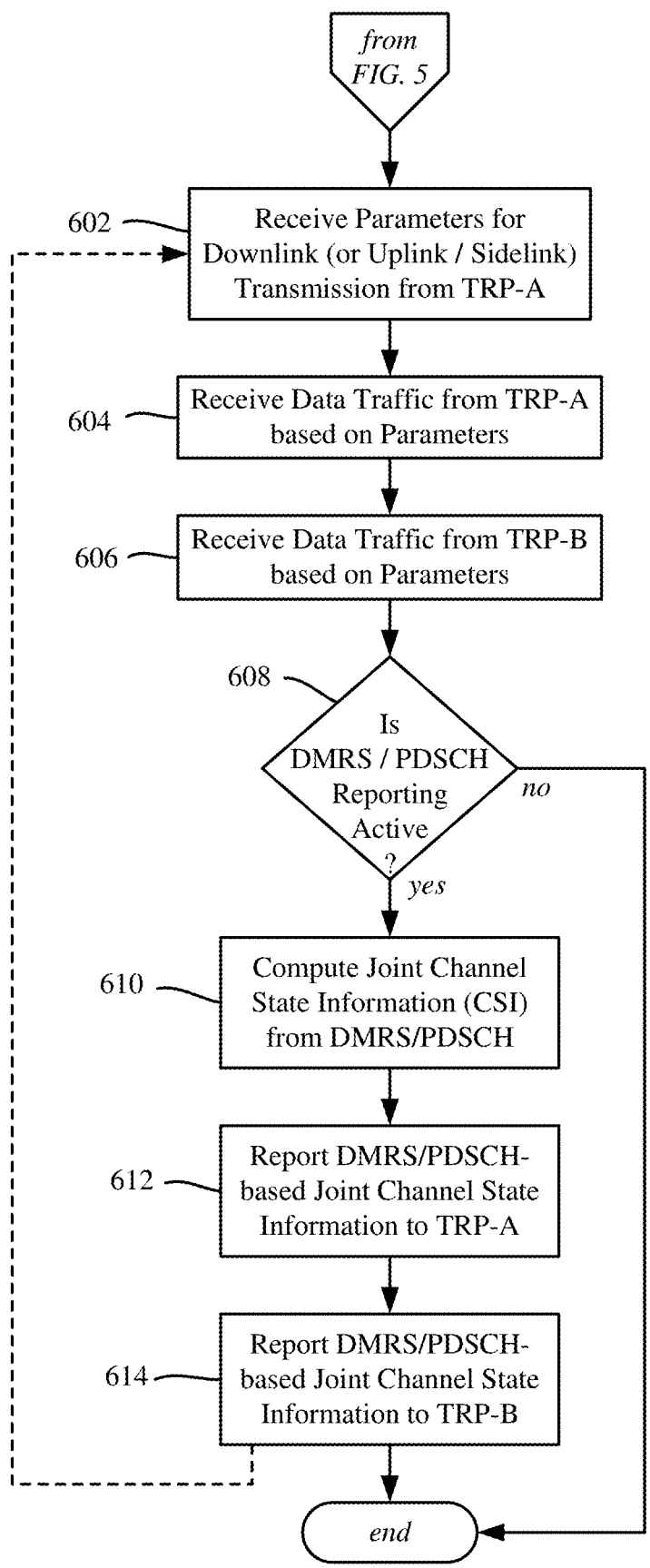

FIGS. 5 and 6 summarize example operations related to DMRS-based channel estimation, beginning at operations 502 and 504, which represent receiving the reference signals from TRP-A and TRP-B, respectively. Operation 506 represents computing the channel state information (CSI) based on the reference signals.

Operation 508 reports the reference signal-based (CSI-RS) channel state information based on the reference signals received from the TRP-A to the TRP-A, e.g., CQI-A. Operation 510 reports the CSI-RS channel state information based on the reference signals received from the TRP-B to the TRP-B, e.g., CQI-B. As described above, the min(CQI-A, CQI-B) or mean (CQI-A, CQI-B) is used by one of the transmission points to compute the parameters for downlink data transmissions.

Operation 602 of FIG. 6 represents receiving the parameters for downlink (or uplink/sidelink) transmission from one of the transmit-receive point devices, e.g., TRP-A. Note that as set forth above, uplink or sidelink communications can also use similarly received transmission parameters based on DMRS-based CSI reporting.

Operation 604 represents receiving data traffic from TRP-A. Operation 606 represents receiving data traffic from TRP-B. As is understood, the data traffic can be combined for such data channel transmissions when duplicated; for example, the user equipment 102 can obtain notification information as to transmission of two duplicate copies of a transport block/data packet from two different TRPs, e.g., two different antenna panels, or two different transmission points with each transmission source corresponding to a different cell. Note that if not notified, the user equipment will individually decode each transport block instance and treat the duplicate transport blocks as interference. Instead, by being notified that the transport blocks are intended to comprise the same data, the duplicated transport blocks can be combined (e.g., soft combined or concatenated as described herein) before decoding, with the combined data decoded once.

Operation 608 represents evaluating whether DMRS/PDSCH reporting is active, and if not end the process and use CSI-RS reporting only. More particularly, the technology described herein can indicate a request for DMRS/PDSCH-based CSI reporting. For example, by using DMRS-based CSI, it is assumed that that the rank indicator (RI)/precoding matrix indicator (PMI) information does not significantly change, as represented in FIGS. 3 and 4. However, in general for high speed UEs, the RI/PMI information can change rapidly, whereby DMRS-based channel estimation is generally not useful. Thus, in one or more implementations the network can indicate whether DMRS-based channel estimation is active or inactive. This can be done in numerous ways; for example, the network control DMRS-based channel estimation by use of data (e.g., a single bit) in the downlink control channel, for requesting the CSI using DMRS or not. In another embodiment, the network can indicate via higher layer signaling, for example radio resource control (RRC) signaling to the UE to thereby activate/deactivate (enable/disable) DMRS-based CSI.

If operation 608 determines that DMRS-based CSI is active, operations 610, 612 and 614 are performed to compute the joint DMRS-based CSI (operation 610) and report the joint CSI to the transmit-receive point devices (operation 612 to TRP-A, operation 614 to TRP-B). Note that the process can returns to operation 602 to receive updated transmission parameters based on the DMRS-based CSI reporting for some number of iterations, until the network (or some other criterion) again triggers reference-signal-based CSI reporting as in FIG. 5. For example, instead of using reference-signal-based CSI reporting every 5 milliseconds, DMRS-based CSI reporting can be used as described herein such that reference-signal-based CSI reporting can instead be performed only every 100 milliseconds, thereby increasing efficiency.

Figure 7:
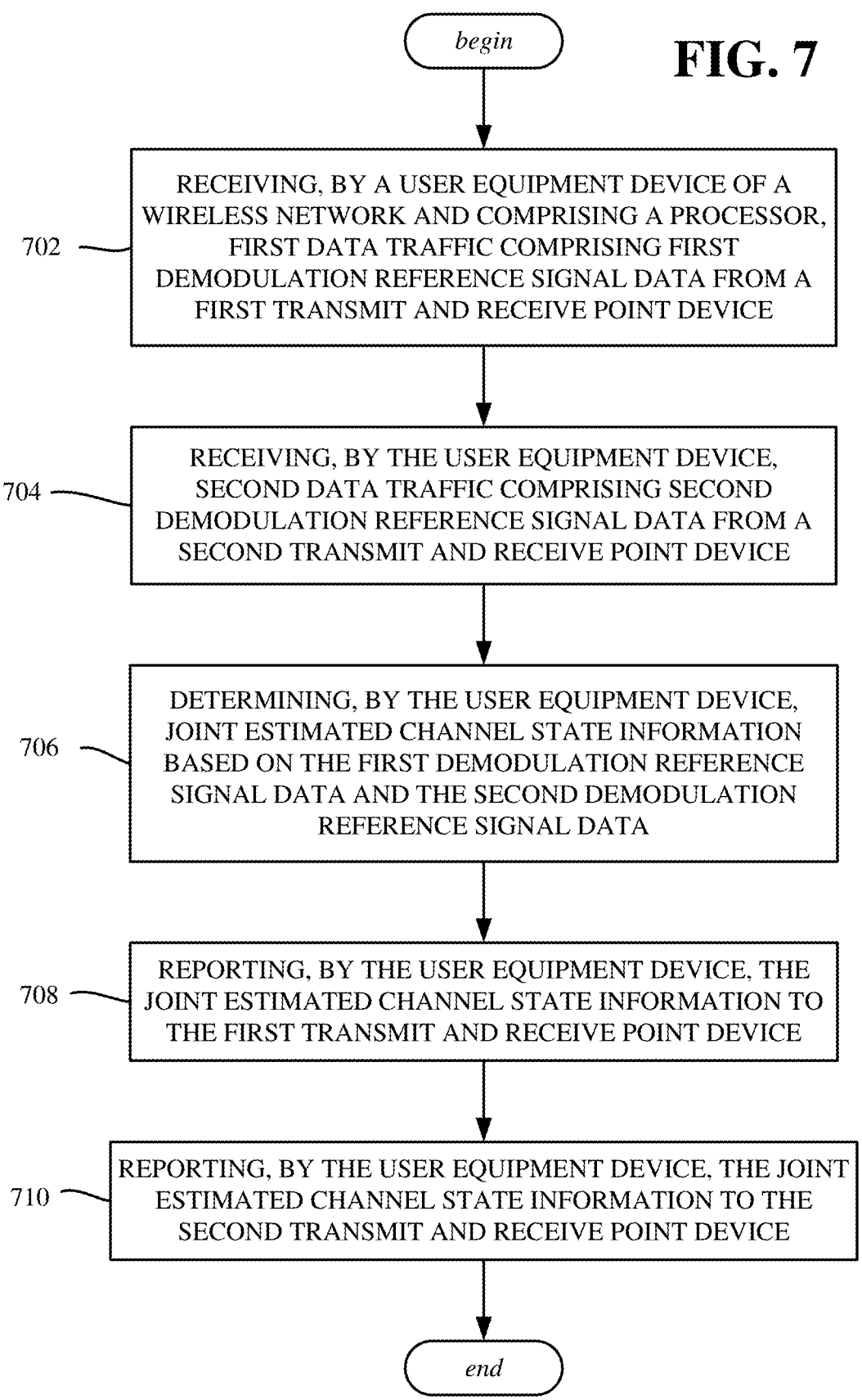
FIG. 7 illustrates a flow diagram of example operations of a user equipment that performs DMRS-based channel state information reporting, in accordance with various aspects and implementations of the subject disclosure.

FIG. 7 summarizes various example operations of a user equipment device in a wireless network and comprising a processor, including operation 702 which represents receiving, by the user equipment device of a wireless network, first data traffic comprising first demodulation reference signal data from a first transmit and receive point device. Operation 704 represents receiving, by the user equipment device, second data traffic comprising second demodulation reference signal data from a second transmit and receive point device. Operation 706 represents determining, by the user equipment device, joint estimated channel state information based on the first demodulation reference signal data and the second demodulation reference signal data. Operation 708 represents reporting, by the user equipment device, the joint estimated channel state information to the first transmit and receive point device. Operation 710 represents reporting, by the user equipment device, the joint estimated channel state information to the second transmit and receive point device.

Aspects can comprise receiving, by the user equipment device, first downlink scheduling data from the first transmit and receive point device based on the reporting the joint estimated channel state information to the first transmit and receive point device, and receiving, by the user equipment device, second downlink scheduling data from the second transmit and receive point device based on the reporting the joint estimated channel state information to the second transmit and receive point device.

Determining the joint estimated channel state information can comprise using a joint channel matrix that combines the first demodulation reference signal data from the first transmit and receive point device and second demodulation reference signal data from the second transmit and receive point device.

Using the joint channel matrix can comprise determining signal-to-interference-plus-noise data, and wherein the joint estimated channel state information comprises the signal-to-interference-plus-noise data.

Determining the joint estimated channel state information can occur in response to receiving a communication to activate demodulation reference signal-based channel state information reporting.

Aspects can comprise receiving, by the user equipment device, first reference signal data from the first transmit and receive point device, determining, by the user equipment device, first channel state information based on the first reference signal data, reporting, by the user equipment device, the first channel state information to the first transmit and receive point device, receiving, by the user equipment device, second reference signal data from the second transmit and receive point device, determining, by the user equipment device, second channel state information based on the second reference signal data, reporting, by the user equipment device, the second channel state information to the second transmit and receive point device, and receiving parameter data from the first transmit and receive point device, wherein the receiving the first data traffic is based on the parameter data.

Aspects can comprise, receiving, by the user equipment device, a communication to deactivate demodulation reference signal-based channel state information reporting, and in response to the receiving the communication, receiving, by the user equipment device, first reference signal data from the first transmit and receive point device, determining first channel state information based on the first reference signal data, reporting the first channel state information to the first transmit and receive point device, receiving second reference signal data from the second transmit and receive point device, determining second channel state information based on the second reference signal data, and reporting the second channel state information to the second transmit and receive point device.

Figure 8:
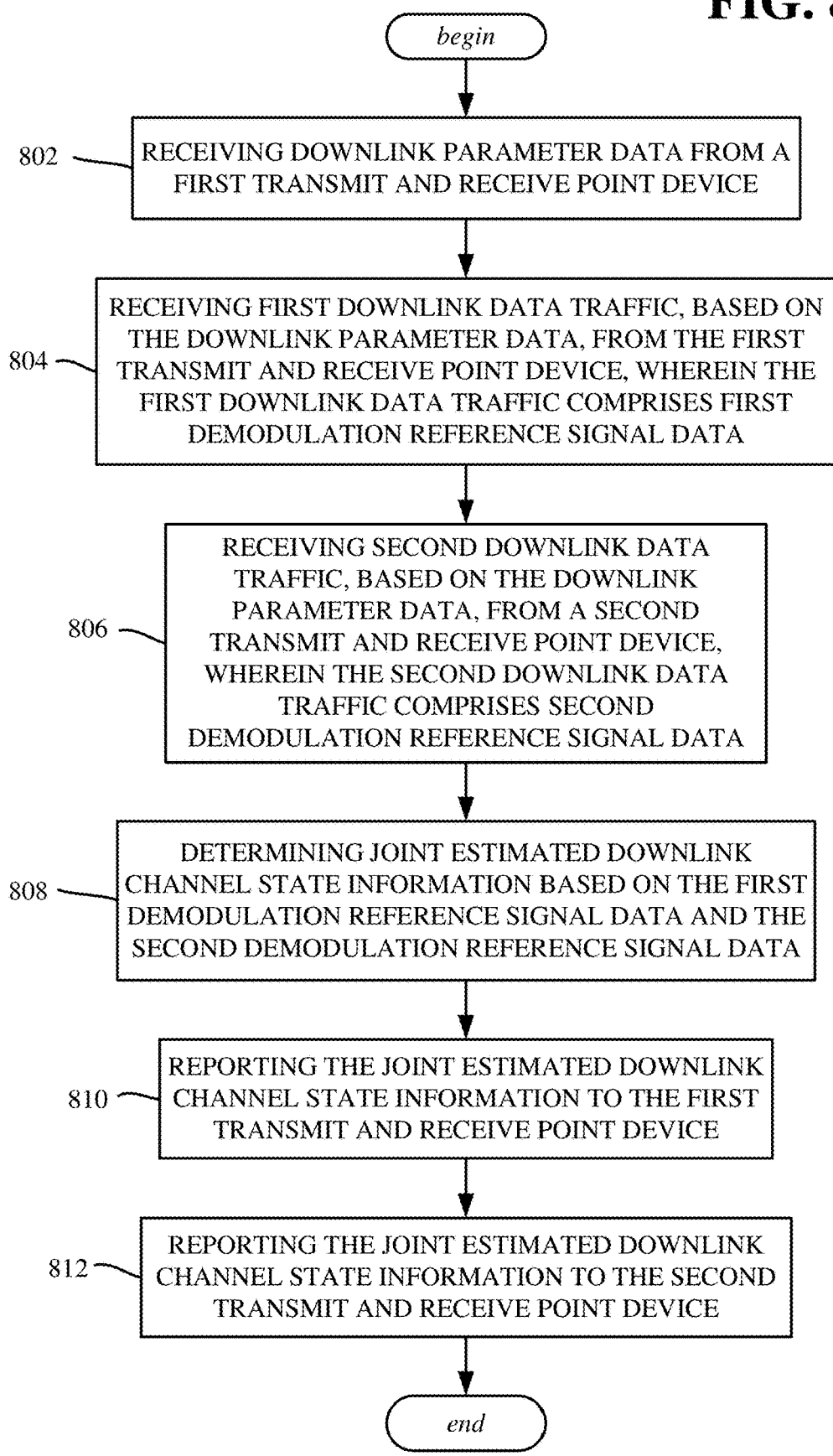
FIG. 8 illustrates a flow diagram of example operations of a user equipment that performs DMRS-based channel state information reporting for downlink data transmissions, in accordance with various aspects and implementations of the subject disclosure.

FIG. 8 summarizes various example operations of a wireless communications device, e.g., comprising a processor and a memory that stores executable instructions that, when executed by the processor, facilitate performance of operations. Operation 802 represents receiving downlink parameter data from a first transmit and receive point device. Operation 804 represents receiving first downlink data traffic, based on the downlink parameter data, from the first transmit and receive point device, wherein the first downlink data traffic comprises first demodulation reference signal data. Operation 806 represents receiving second downlink data traffic, based on the downlink parameter data, from a second transmit and receive point device, wherein the second downlink data traffic comprises second demodulation reference signal data. Operation 808 represents determining joint estimated downlink channel state information based on the first demodulation reference signal data and the second demodulation reference signal data. Operation 810 represents reporting the joint estimated downlink channel state information to the first transmit and receive point device. Operation 812 represents reporting the joint estimated downlink channel state information to the second transmit and receive point device.

Further operations can comprise receiving a communication from the first transmit and receive point device to activate demodulation reference signal-based channel state information reporting, and wherein the determining the joint estimated channel state information occurs in response to receiving the communication.

Further operations can comprise receiving a communication to deactivate demodulation reference signal-based channel state information reporting. Further operations can comprise, in response to the receiving the communication to deactivate, receiving, by the user equipment device, first reference signal data from the first transmit and receive point device, determining first channel state information based on the first reference signal data, reporting the first channel state information to the first transmit and receive point device, receiving second reference signal data from the second transmit and receive point device, determining second channel state information based on the second reference signal data, and reporting the second channel state information to the second transmit and receive point device.

The downlink parameter data can comprise first downlink parameter data, and further operations can comprise receiving second downlink parameter data, based on the joint estimated downlink channel state information, from the first transmit and receive point device.

The joint estimated downlink channel state information can be first joint estimated downlink channel state information, and further operations can comprise, receiving third downlink data traffic, based on the second downlink parameter data, from the first transmit and receive point device, wherein the third downlink data traffic can comprise third demodulation reference signal data; receiving fourth downlink data traffic, based on the second downlink parameter data, from the second transmit and receive point device, wherein the fourth downlink data traffic can comprise fourth demodulation reference signal data; determining second joint estimated downlink channel state information based on the third demodulation reference signal data and the fourth demodulation reference signal data, reporting the second joint estimated downlink channel state information to the first transmit and receive point device, and reporting the second joint estimated downlink channel state information to the second transmit and receive point device.

Further operations can comprise receiving uplink parameter data, based on the joint estimated downlink channel state information, from the first transmit and receive point device, sending first uplink data traffic, based on the uplink parameter data, to the first transmit and receive point device, and sending second uplink data traffic, based on the uplink parameter data, to the second transmit and receive point device.

Further operations can comprise receiving sidelink parameter data, based on the joint estimated downlink channel state information, from the first transmit and receive point device, communicating first sidelink data traffic, based on the sidelink parameter data, with the first transmit and receive point device, and communicating second sidelink data traffic, based on the sidelink parameter data, with the second transmit and receive point device.

Figure 9:
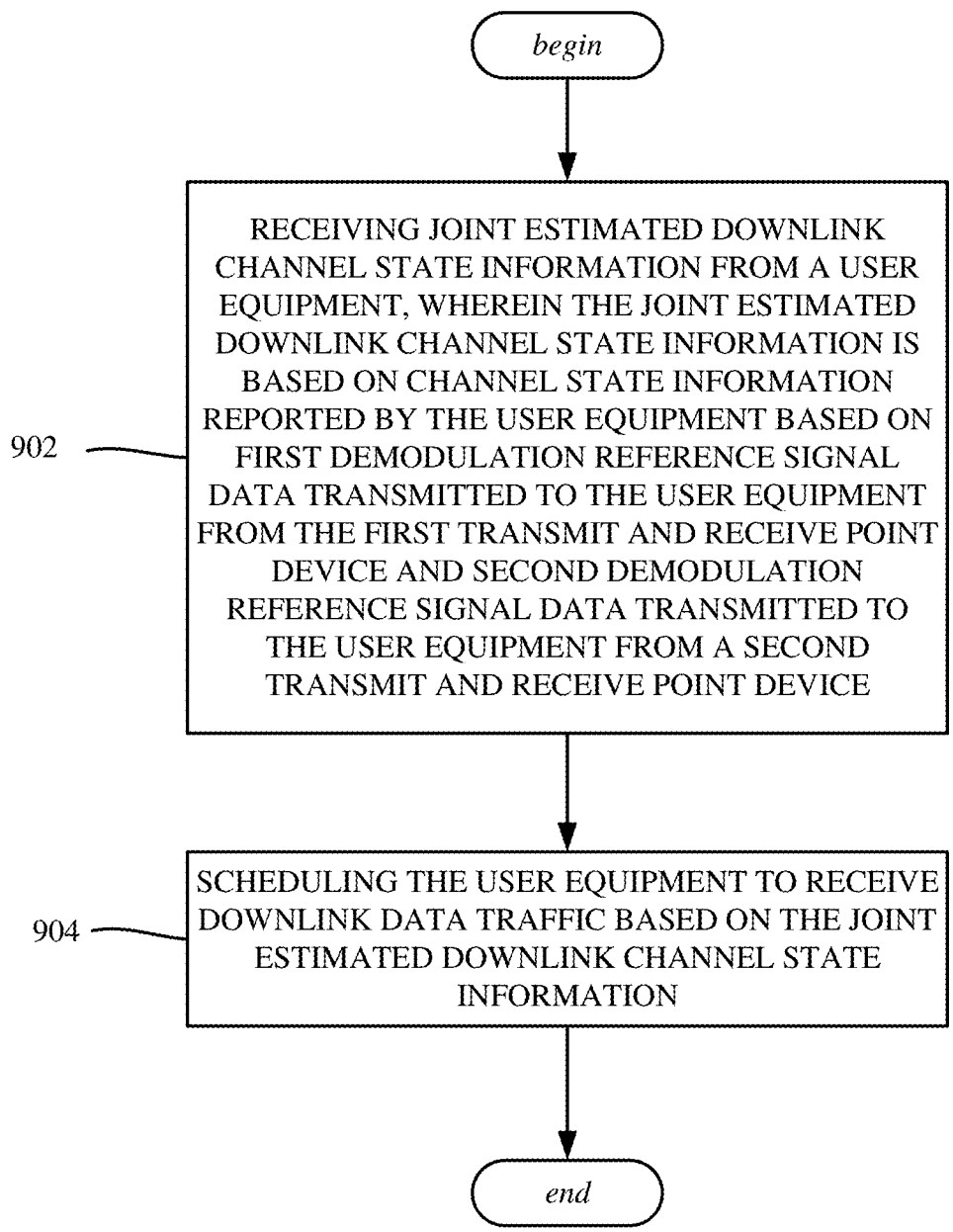
FIG. 9 illustrates a flow diagram of example operations of a transmit-receive point device with respect to scheduling a user equipment based on DMRS-based channel state information reporting, in accordance with various aspects and implementations of the subject disclosure.

Other example operations are represented in FIG. 9, and which, for example, can be implemented via a machine-readable storage medium, comprising executable instructions that, when executed by a processor of a transmit-receive point device of a wireless network, facilitate performance of the operations. Operation 902 represents receiving joint estimated downlink channel state information from a user equipment, in which the joint estimated downlink channel state information is based on channel state information reported by the user equipment based on first demodulation reference signal data transmitted to the user equipment from the first transmit and receive point device and second demodulation reference signal data transmitted to the user equipment from a second transmit and receive point device. Operation 904 represents scheduling the user equipment to receive downlink data traffic based on the joint estimated downlink channel state information.

The joint estimated downlink channel state information can be first joint estimated downlink channel state information, and the downlink data traffic can be first downlink data traffic; further operations can comprise receiving second joint estimated downlink channel state information from the user equipment, and scheduling the user equipment to receive second downlink data traffic based on the second joint estimated downlink channel state information.

The downlink data traffic can be second downlink data traffic, and the joint estimated downlink channel state information can be reported based on first data traffic comprising first demodulation reference signal data transmitted to the user equipment based on reference signal-based channel state information reporting.

As can be seen, the technology described herein thus facilitates a user equipment to report CSI using DMRS and PDSCH based channel estimation. The network can indicate the DMRS-based CSI request, that is, activate or deactivate DMRS and PDSCH based channel estimation. This provides significant gains in sector throughput and cell edge user throughput as the network efficiently obtains channel quality information. Further, the technology results in a reduction in the signaling overhead, including by reducing the frequency of CSI-RS-based channel quality estimation. The technology described herein applies to downlink, uplink and sidelink data transmission in multi-TRP systems.

Figure 10:
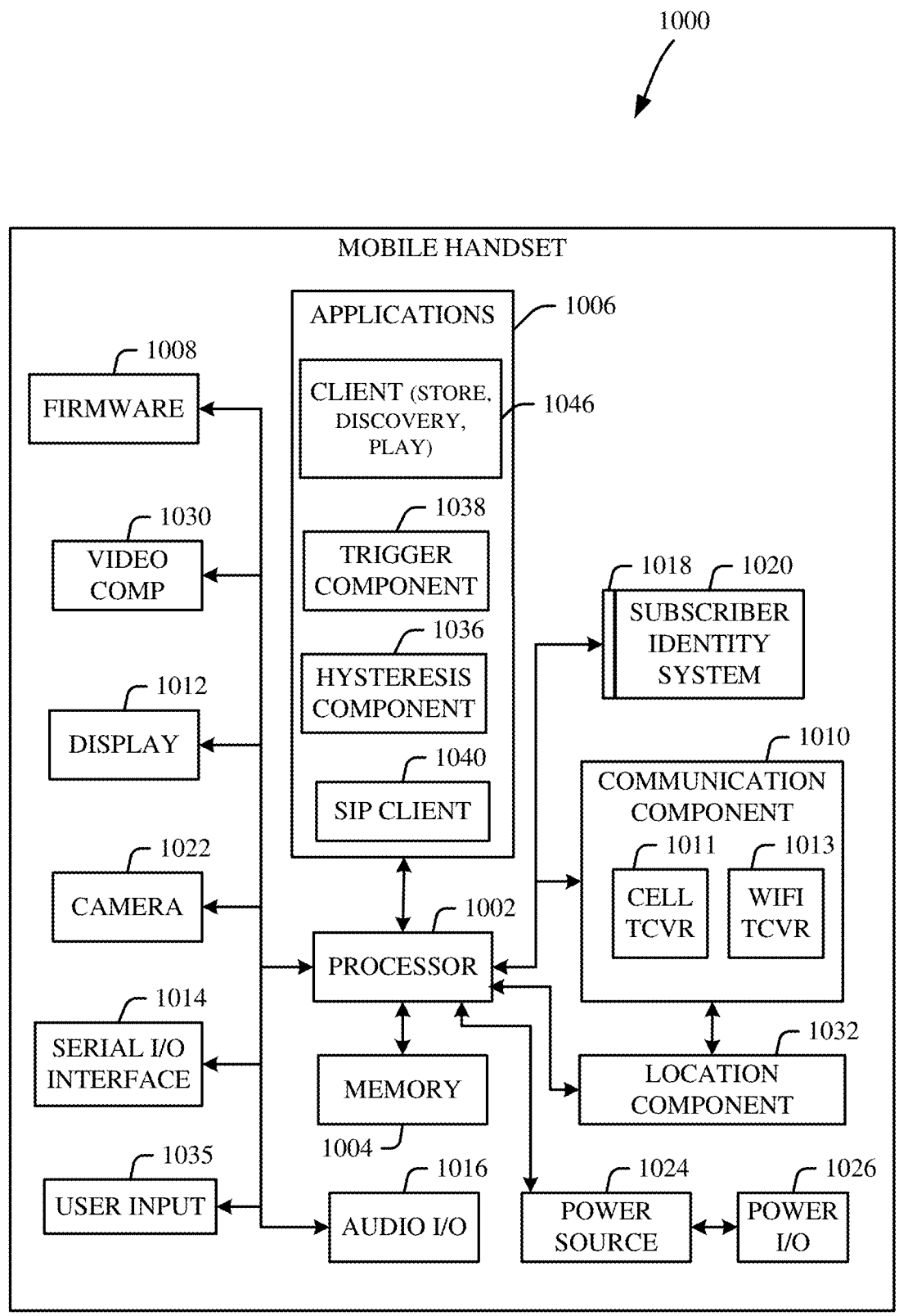
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
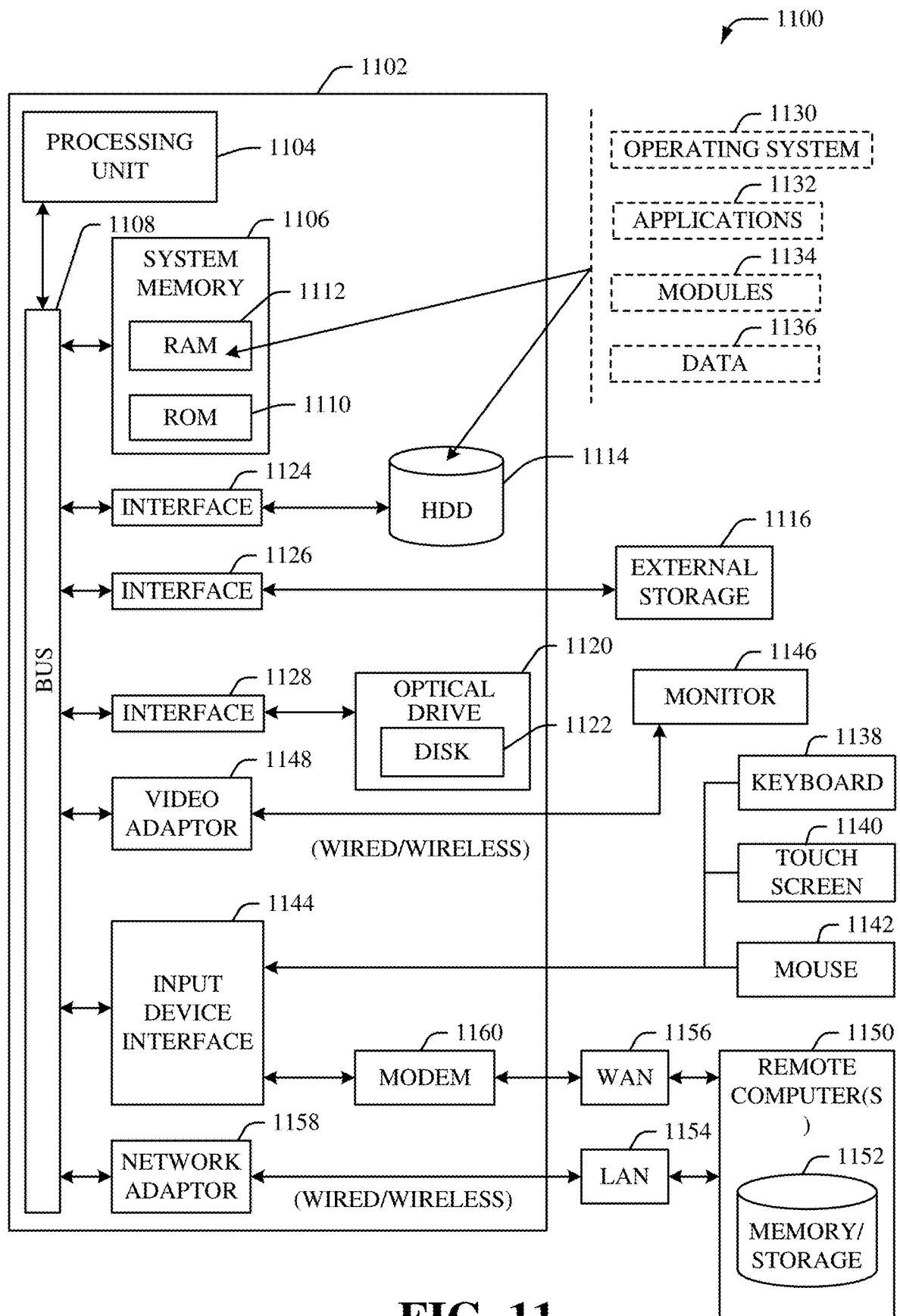
FIG. 11 illustrates an example block diagram of an example computer operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
receiving, by a user equipment comprising a processor, first data traffic comprising first demodulation reference signal data from a first transmit and receive point device;
receiving, by the user equipment, second data traffic comprising second demodulation reference signal data from a second transmit and receive point device;
determining, by the user equipment, joint estimated channel state information based on the first demodulation reference signal data and the second demodulation reference signal data;
reporting, by the user equipment, the joint estimated channel state information to the first transmit and receive point device;
reporting, by the user equipment, the joint estimated channel state information to the second transmit and receive point device;
receiving, by the user equipment, sidelink parameter data, based on the joint estimated channel state information, from the first transmit and receive point device;
communicating, by the user equipment, first sidelink data traffic, based on the sidelink parameter data, with the first transmit and receive point device; and
communicating, by the user equipment, second sidelink data traffic, based on the sidelink parameter data, with the second transmit and receive point device.

2. The method of claim 1, further comprising:
receiving, by the user equipment, first downlink scheduling data from the first transmit and receive point device based on the reporting of the joint estimated channel state information to the first transmit and receive point device, and
receiving, by the user equipment, second downlink scheduling data from the second transmit and receive point device based on the reporting of the joint estimated channel state information to the second transmit and receive point device.

3. The method of claim 1, wherein the determining of the joint estimated channel state information comprises using a joint channel matrix that combines the first demodulation reference signal data from the first transmit and receive point device and the second demodulation reference signal data from the second transmit and receive point device.

4. The method of claim 3, wherein the using of the joint channel matrix comprises determining signal-to-interference-plus-noise data, and wherein the joint estimated channel state information comprises the signal-to-interference-plus-noise data.

5. The method of claim 1, wherein the determining of the joint estimated channel state information occurs in response to receiving a communication to activate demodulation reference signal-based channel state information reporting.

6. The method of claim 1, further comprising:
receiving, by the user equipment, first reference signal data from the first transmit and receive point device,
determining, by the user equipment, first channel state information based on the first reference signal data,
reporting, by the user equipment, the first channel state information to the first transmit and receive point device,
receiving, by the user equipment, second reference signal data from the second transmit and receive point device,
determining, by the user equipment, second channel state information based on the second reference signal data,
reporting, by the user equipment, the second channel state information to the second transmit and receive point device, and
receiving, by the user equipment, parameter data from the first transmit and receive point device, wherein the receiving of the first data traffic is based on the parameter data.

7. The method of claim 1, further comprising:
receiving, by the user equipment, a communication to deactivate demodulation reference signal-based channel state information reporting, and
in response to the receiving of the communication:
receiving, by the user equipment, first reference signal data from the first transmit and receive point device,
determining first channel state information based on the first reference signal data,
reporting the first channel state information to the first transmit and receive point device,
receiving second reference signal data from the second transmit and receive point device,
determining second channel state information based on the second reference signal data, and
reporting the second channel state information to the second transmit and receive point device.

8. A wireless mobile communications device comprising:
a processor; and
a memory that stores executable instructions that, when executed by the processor, facilitate performance of operations, the operations comprising:
receiving downlink parameter data from a first transmit and receive point device;
receiving first downlink data traffic, based on the downlink parameter data, from the first transmit and receive point device, wherein the first downlink data traffic comprises first demodulation reference signal data;
receiving second downlink data traffic, based on the downlink parameter data, from a second transmit and receive point device, wherein the second downlink data traffic comprises second demodulation reference signal data;
determining joint estimated downlink channel state information based on the first demodulation reference signal data and the second demodulation reference signal data;
reporting the joint estimated downlink channel state information to the first transmit and receive point device;
reporting the joint estimated downlink channel state information to the second transmit and receive point device;
receiving uplink parameter data, determined based on the joint estimated downlink channel state information, from the first transmit and receive point device;
sending first uplink data traffic, based on the uplink parameter data, to the first transmit and receive point device; and
sending second uplink data traffic, based on the uplink parameter data, to the second transmit and receive point device.

9. The mobile communications device of claim 8, wherein the operations further comprise, receiving a communication from the first transmit and receive point device to activate demodulation reference signal-based channel state information reporting, and wherein the determining of the joint estimated downlink channel state information occurs in response to receiving the communication.

10. The mobile communications device of claim 8, wherein the operations further comprise, receiving a communication to deactivate demodulation reference signal-based channel state information reporting.

11. The mobile communications device of claim 10, wherein the operations further comprise:
in response to the receiving of the communication to deactivate:
receiving first reference signal data from the first transmit and receive point device,
determining first channel state information based on the first reference signal data, reporting the first channel state information to the first transmit and receive point device, receiving second reference signal data from the second transmit and receive point device,
determining second channel state information based on the second reference signal data, and
reporting the second channel state information to the second transmit and receive point device.

12. The mobile communications device of claim 8, wherein the downlink parameter data is first downlink parameter data, and wherein the operations further comprise, receiving second downlink parameter data, based on the joint estimated downlink channel state information, from the first transmit and receive point device.

13. The mobile communications device of claim 12, wherein the joint estimated downlink channel state information is first joint estimated downlink channel state information, and wherein the operations further comprise:
receiving third downlink data traffic, based on the second downlink parameter data, from the first transmit and receive point device, wherein the third downlink data traffic comprises third demodulation reference signal data,
receiving fourth downlink data traffic, based on the second downlink parameter data, from the second transmit and receive point device, wherein the fourth downlink data traffic comprises fourth demodulation reference signal data,
determining second joint estimated downlink channel state information based on the third demodulation reference signal data and the fourth demodulation reference signal data,
reporting the second joint estimated downlink channel state information to the first transmit and receive point device, and
reporting the second joint estimated downlink channel state information to the second transmit and receive point device.

14. The mobile communications device of claim 8, wherein the operations further comprise:
receiving sidelink parameter data, based on the joint estimated downlink channel state information, from the first transmit and receive point device,
communicating first sidelink data traffic, based on the sidelink parameter data, with the first transmit and receive point device, and
communicating second sidelink data traffic, based on the sidelink parameter data, with the second transmit and receive point device.

15. A non-transitory machine-readable medium, comprising executable instructions that, when executed by a processor of a user equipment, facilitate performance of operations, the operations comprising:
receiving first data traffic comprising first demodulation reference signal data from a first transmit and receive point device;
receiving second data traffic comprising second demodulation reference signal data from a second transmit and receive point device;
determining joint estimated channel state information based on the first demodulation reference signal data and the second demodulation reference signal data;
reporting the joint estimated channel state information to the first transmit and receive point device;
reporting the joint estimated channel state information to the second transmit and receive point device;
receiving uplink parameter data, based on the joint estimated channel state information, from the first transmit and receive point device;
transmitting first uplink data traffic, based on the uplink parameter data, to the first transmit and receive point device; and
transmitting second uplink data traffic, based on the uplink parameter data, to the second transmit and receive point device.

16. The non-transitory machine-readable medium of claim 15, wherein the operations further comprise:
receiving first downlink scheduling data from the first transmit and receive point device based on the reporting of the joint estimated channel state information to the first transmit and receive point device, and
receiving second downlink scheduling data from the second transmit and receive point device based on the reporting of the joint estimated channel state information to the second transmit and receive point device.

17. The non-transitory machine-readable medium of claim 15, wherein the determining the joint estimated channel state information comprises using a joint channel matrix that combines the first demodulation reference signal data from the first transmit and receive point device and the second demodulation reference signal data from the second transmit and receive point device.

18. The non-transitory machine-readable medium of claim 17, wherein the using of the joint channel matrix comprises determining signal-to-interference-plus-noise data, and wherein the joint estimated channel state information comprises the signal-to-interference-plus-noise data.

19. The non-transitory machine-readable medium of claim 15, wherein the determining of the joint estimated channel state information occurs in response to receiving a communication to activate demodulation reference signal-based channel state information reporting.

20. The non-transitory machine-readable medium of claim 15, wherein the operations further comprise:
receiving first reference signal data from the first transmit and receive point device, determining first channel state information based on the first reference signal data,
reporting the first channel state information to the first transmit and receive point device,
receiving second reference signal data from the second transmit and receive point device,
determining second channel state information based on the second reference signal data,
reporting the second channel state information to the second transmit and receive point device, and
receiving parameter data from the first transmit and receive point device, wherein the receiving of the first data traffic is based on the parameter data.

* * * * *